United States Patent
McCloskey

(10) Patent No.: US 8,436,907 B2
(45) Date of Patent: May 7, 2013

(54) HETEROGENEOUS VIDEO CAPTURING SYSTEM

(75) Inventor: Scott McCloskey, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 799 days.

(21) Appl. No.: 12/651,423

(22) Filed: Dec. 31, 2009

(65) Prior Publication Data

US 2010/0182440 A1    Jul. 22, 2010

Related U.S. Application Data

(63) Continuation-in-part of application No. 12/501,874, filed on Jul. 13, 2009, which is a continuation-in-part of application No. 12/126,761, filed on May 23, 2008, application No. 12/651,423, which is a continuation-in-part of application No. 12/421,296, filed on Apr. 9, 2009.

(60) Provisional application No. 61/052,147, filed on May 9, 2008, provisional application No. 61/156,739, filed on Mar. 2, 2009.

(51) Int. Cl.
*H04N 5/228* (2006.01)

(52) U.S. Cl.
USPC ....................................................... 348/208.4

(58) Field of Classification Search .. 348/208.4–208.11, 348/222.1; 396/52, 173
See application file for complete search history.

(56) References Cited

U.S. PATENT DOCUMENTS

| | | | |
|---|---|---|---|
| 4,641,349 A | 2/1987 | Flom et al. |
| 4,836,670 A | 6/1989 | Hutchinson |
| 5,231,674 A | 7/1993 | Cleveland et al. |
| 5,291,560 A | 3/1994 | Daugman |
| 5,293,427 A | 3/1994 | Ueno et al. |
| 5,359,382 A | 10/1994 | Uenaka |
| 5,404,013 A | 4/1995 | Tajima |
| 5,543,887 A | 8/1996 | Akashi |

(Continued)

FOREIGN PATENT DOCUMENTS

| | | |
|---|---|---|
| EP | 0484076 | 5/1992 |
| EP | 0593386 | 4/1994 |

(Continued)

OTHER PUBLICATIONS

Avcibas et al., "Steganalysis Using Image Quality Metrics," IEEE Transactions on Image Processing, vol. 12, No. 2, pp. 221-229, Feb. 2003.

(Continued)

*Primary Examiner* — Chieh M Fan
*Assistant Examiner* — Akshay Trehan
(74) *Attorney, Agent, or Firm* — Seager Tufte & Wickhem LLC

(57) ABSTRACT

A heterogeneous video capturing system having motion and blur estimation. An item of motion may be captured with a continuous shutter and a flutter shutter. The flutter shutter image may be preceded and following by a continuous shutter image. Motion of a subject of the images may be estimated from the shutter images. The estimated motion may be a basis for blur estimation and blur removal from the flutter shutter image.

19 Claims, 4 Drawing Sheets

U.S. PATENT DOCUMENTS

| | | | |
|---|---|---|---|
| 5,551,027 A | 8/1996 | Choy et al. |
| 5,572,596 A | 11/1996 | Wildes et al. |
| 5,608,472 A | 3/1997 | Szirth et al. |
| 5,664,239 A | 9/1997 | Nakata |
| 5,671,447 A | 9/1997 | Tokunaga |
| 5,687,031 A | 11/1997 | Ishihara |
| 5,717,512 A | 2/1998 | Chmielewski, Jr. et al. |
| 5,751,836 A | 5/1998 | Wildes et al. |
| 5,859,686 A | 1/1999 | Aboutalib et al. |
| 5,860,032 A | 1/1999 | Iwane |
| 5,896,174 A | 4/1999 | Nakata |
| 5,901,238 A | 5/1999 | Matsuhita |
| 5,909,269 A | 6/1999 | Isogai et al. |
| 5,953,440 A | 9/1999 | Zhang et al. |
| 5,956,122 A | 9/1999 | Doster |
| 5,978,494 A | 11/1999 | Zhang |
| 5,991,429 A | 11/1999 | Coffin et al. |
| 6,005,704 A | 12/1999 | Chmielewski, Jr. et al. |
| 6,007,202 A | 12/1999 | Apple et al. |
| 6,012,376 A | 1/2000 | Hanke et al. |
| 6,021,210 A | 2/2000 | Camus et al. |
| 6,028,949 A | 2/2000 | McKendall |
| 6,055,322 A | 4/2000 | Salganicoff et al. |
| 6,064,752 A | 5/2000 | Rozmus et al. |
| 6,069,967 A | 5/2000 | Rozmus et al. |
| 6,081,607 A | 6/2000 | Mori et al. |
| 6,088,470 A | 7/2000 | Camus et al. |
| 6,091,899 A | 7/2000 | Konishi et al. |
| 6,101,477 A | 8/2000 | Hohle et al. |
| 6,104,431 A | 8/2000 | Inoue et al. |
| 6,108,636 A | 8/2000 | Yap et al. |
| 6,119,096 A | 9/2000 | Mann et al. |
| 6,120,461 A | 9/2000 | Smyth |
| 6,134,339 A | 10/2000 | Luo |
| 6,144,754 A | 11/2000 | Okano et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,259,478 B1 | 7/2001 | Hori |
| 6,282,475 B1 | 8/2001 | Washington |
| 6,285,505 B1 | 9/2001 | Melville et al. |
| 6,285,780 B1 | 9/2001 | Yamakita et al. |
| 6,289,113 B1 | 9/2001 | McHugh et al. |
| 6,299,306 B1 | 10/2001 | Braithwaite et al. |
| 6,308,015 B1 | 10/2001 | Matsumoto |
| 6,309,069 B1 | 10/2001 | Seal et al. |
| 6,320,610 B1 | 11/2001 | Van Sant et al. |
| 6,320,612 B1 | 11/2001 | Young |
| 6,320,973 B2 | 11/2001 | Suzaki et al. |
| 6,323,761 B1 | 11/2001 | Son |
| 6,325,765 B1 | 12/2001 | Hay et al. |
| 6,330,674 B1 | 12/2001 | Angelo et al. |
| 6,332,193 B1 | 12/2001 | Glass et al. |
| 6,344,683 B1 | 2/2002 | Kim |
| 6,370,260 B1 | 4/2002 | Pavlidis et al. |
| 6,377,699 B1 | 4/2002 | Musgrave et al. |
| 6,393,136 B1 | 5/2002 | Amir et al. |
| 6,400,835 B1 | 6/2002 | Lemelson et al. |
| 6,424,727 B1 | 7/2002 | Musgrave et al. |
| 6,424,845 B1 | 7/2002 | Emmoft et al. |
| 6,433,818 B1 | 8/2002 | Steinberg et al. |
| 6,438,752 B1 | 8/2002 | McClard |
| 6,441,482 B1 | 8/2002 | Foster |
| 6,446,045 B1 | 9/2002 | Stone et al. |
| 6,483,930 B1 | 11/2002 | Musgrave et al. |
| 6,484,936 B1 | 11/2002 | Nicoll et al. |
| 6,490,443 B1 | 12/2002 | Freeny, Jr. |
| 6,493,363 B1 | 12/2002 | Roger et al. |
| 6,493,669 B1 | 12/2002 | Curry et al. |
| 6,494,363 B1 | 12/2002 | Roger et al. |
| 6,503,163 B1 | 1/2003 | Van Sant et al. |
| 6,505,193 B1 | 1/2003 | Musgrave et al. |
| 6,506,078 B1 | 1/2003 | Mori et al. |
| 6,508,397 B1 | 1/2003 | Do |
| 6,516,078 B1 | 2/2003 | Yang et al. |
| 6,516,087 B1 | 2/2003 | Camus |
| 6,516,416 B2 | 2/2003 | Gregg et al. |
| 6,522,772 B1 | 2/2003 | Morrison et al. |
| 6,523,165 B2 | 2/2003 | Liu et al. |
| 6,526,160 B1 | 2/2003 | Ito |
| 6,532,298 B1 | 3/2003 | Cambier et al. |
| 6,540,392 B1 | 4/2003 | Braithwaite |
| 6,542,624 B1 | 4/2003 | Oda |
| 6,546,121 B1 | 4/2003 | Oda |
| 6,553,494 B1 | 4/2003 | Glass |
| 6,580,356 B1 | 6/2003 | Alt et al. |
| 6,591,001 B1 | 7/2003 | Oda et al. |
| 6,591,064 B2 | 7/2003 | Higashiyama et al. |
| 6,594,377 B1 | 7/2003 | Kim et al. |
| 6,594,399 B1 | 7/2003 | Camus et al. |
| 6,598,971 B2 | 7/2003 | Cleveland |
| 6,600,878 B2 | 7/2003 | Pregara |
| 6,614,919 B1 | 9/2003 | Suzaki et al. |
| 6,652,099 B2 | 11/2003 | Chae et al. |
| 6,674,367 B2 | 1/2004 | Sweatte |
| 6,687,389 B2 | 2/2004 | McCartney et al. |
| 6,690,997 B2 | 2/2004 | Rivalto |
| 6,708,176 B2 | 3/2004 | Strunk et al. |
| 6,709,734 B2 | 3/2004 | Higashi et al. |
| 6,711,562 B1 | 3/2004 | Ross et al. |
| 6,714,665 B1 | 3/2004 | Hanna et al. |
| 6,718,049 B2 | 4/2004 | Pavlidis et al. |
| 6,718,050 B1 | 4/2004 | Yamamoto |
| 6,718,665 B2 | 4/2004 | Hess et al. |
| 6,732,278 B2 | 5/2004 | Baird, III et al. |
| 6,734,783 B1 | 5/2004 | Anbai |
| 6,745,520 B2 | 6/2004 | Puskaric et al. |
| 6,750,435 B2 | 6/2004 | Ford |
| 6,751,733 B1 | 6/2004 | Nakamura et al. |
| 6,753,919 B1 | 6/2004 | Daugman |
| 6,754,640 B2 | 6/2004 | Bozeman |
| 6,760,467 B1 | 7/2004 | Min et al. |
| 6,765,470 B2 | 7/2004 | Shinzaki |
| 6,766,041 B2 | 7/2004 | Golden et al. |
| 6,775,774 B1 | 8/2004 | Harper |
| 6,785,406 B1 | 8/2004 | Kamada |
| 6,792,134 B2 | 9/2004 | Chen et al. |
| 6,793,134 B2 | 9/2004 | Clark |
| 6,819,219 B1 | 11/2004 | Bolle et al. |
| 6,829,370 B1 | 12/2004 | Pavlidis et al. |
| 6,832,044 B2 | 12/2004 | Doi et al. |
| 6,836,554 B1 | 12/2004 | Bolle et al. |
| 6,837,436 B2 | 1/2005 | Swartz et al. |
| 6,845,479 B2 | 1/2005 | Park |
| 6,853,444 B2 | 2/2005 | Haddad |
| 6,867,683 B2 | 3/2005 | Calvesio et al. |
| 6,873,960 B1 | 3/2005 | Wood et al. |
| 6,896,187 B2 | 5/2005 | Stockhammer |
| 6,905,411 B2 | 6/2005 | Nguyen et al. |
| 6,920,237 B2 | 7/2005 | Chen et al. |
| 6,930,707 B2 | 8/2005 | Bates et al. |
| 6,934,849 B2 | 8/2005 | Kramer et al. |
| 6,950,139 B2 | 9/2005 | Fujinawa |
| 6,954,738 B2 | 10/2005 | Wang et al. |
| 6,957,341 B2 | 10/2005 | Rice et al. |
| 6,964,666 B2 | 11/2005 | Jackson |
| 6,968,457 B2 | 11/2005 | Tam |
| 6,972,797 B2 | 12/2005 | Izumi |
| 6,992,562 B2 | 1/2006 | Fuks et al. |
| 6,992,717 B2 | 1/2006 | Hatano |
| 7,003,669 B2 | 2/2006 | Monk |
| 7,017,359 B2 | 3/2006 | Kim et al. |
| 7,030,351 B2 | 4/2006 | Wasserman et al. |
| 7,031,539 B2 | 4/2006 | Tisse et al. |
| 7,043,056 B2 | 5/2006 | Edwards et al. |
| 7,053,948 B2 | 5/2006 | Konishi |
| 7,058,209 B2 | 6/2006 | Chen et al. |
| 7,071,971 B2 | 7/2006 | Elberbaum |
| 7,076,087 B2 | 7/2006 | Wakiyama |
| 7,084,904 B2 | 8/2006 | Liu et al. |
| 7,092,555 B2 | 8/2006 | Lee et al. |
| 7,095,901 B2 | 8/2006 | Lee et al. |
| 7,100,818 B2 | 9/2006 | Swaine |
| 7,113,170 B2 | 9/2006 | Lauper et al. |
| 7,114,080 B2 | 9/2006 | Rahman et al. |
| 7,120,607 B2 | 10/2006 | Bolle et al. |
| 7,125,335 B2 | 10/2006 | Rowe |

| Patent | Type | Date | Inventor |
|---|---|---|---|
| 7,130,452 | B2 | 10/2006 | Bolle et al. |
| 7,130,453 | B2 | 10/2006 | Kondo et al. |
| 7,135,980 | B2 | 11/2006 | Moore et al. |
| 7,136,581 | B2 | 11/2006 | Fujii |
| 7,145,457 | B2 | 12/2006 | Spitz et al. |
| 7,146,027 | B2 | 12/2006 | Kim et al. |
| 7,152,085 | B2 | 12/2006 | Tisse |
| 7,155,035 | B2 | 12/2006 | Kondo et al. |
| 7,169,052 | B2 | 1/2007 | Beaulieu |
| 7,173,348 | B2 | 2/2007 | Voda et al. |
| 7,174,036 | B2 | 2/2007 | Ohba |
| 7,177,449 | B2 | 2/2007 | Russon et al. |
| 7,181,049 | B2 | 2/2007 | Ike |
| 7,183,895 | B2 | 2/2007 | Bazakos et al. |
| 7,184,577 | B2 | 2/2007 | Chen et al. |
| 7,187,786 | B2 | 3/2007 | Kee |
| 7,191,936 | B2 | 3/2007 | Smith et al. |
| 7,197,166 | B2 | 3/2007 | Jeng |
| 7,197,173 | B2 | 3/2007 | Jones et al. |
| 7,203,343 | B2 | 4/2007 | Manasse et al. |
| 7,204,425 | B2 | 4/2007 | Mosher, Jr. et al. |
| 7,206,431 | B2 | 4/2007 | Schuessler |
| 7,215,797 | B2 | 5/2007 | Park |
| 7,226,164 | B2 | 6/2007 | Abourizk et al. |
| 7,239,726 | B2 | 7/2007 | Li |
| 7,269,737 | B2 | 9/2007 | Robinson |
| 7,271,839 | B2 | 9/2007 | Lee et al. |
| 7,272,380 | B2 | 9/2007 | Lee et al. |
| 7,272,385 | B2 | 9/2007 | Mirouze et al. |
| 7,277,561 | B2 | 10/2007 | Shin |
| 7,277,891 | B2 | 10/2007 | Howard et al. |
| 7,280,984 | B2 | 10/2007 | Phelan, III et al. |
| 7,287,021 | B2 | 10/2007 | De Smet |
| 7,298,873 | B2 | 11/2007 | Miller, Jr. et al. |
| 7,298,874 | B2 | 11/2007 | Cho |
| 7,305,089 | B2 | 12/2007 | Morikawa et al. |
| 7,309,126 | B2 | 12/2007 | Mihashi et al. |
| 7,312,818 | B2 | 12/2007 | Ooi et al. |
| 7,313,529 | B2 | 12/2007 | Thompson |
| 7,315,233 | B2 | 1/2008 | Yuhara |
| 7,331,667 | B2 | 2/2008 | Grotehusmann et al. |
| 7,333,637 | B2 | 2/2008 | Walfridsson |
| 7,333,798 | B2 | 2/2008 | Hodge |
| 7,336,806 | B2 | 2/2008 | Schonberg et al. |
| 7,338,167 | B2 | 3/2008 | Zelvin et al. |
| 7,346,195 | B2 | 3/2008 | Lauper et al. |
| 7,346,779 | B2 | 3/2008 | Leeper |
| 7,353,399 | B2 | 4/2008 | Ooi et al. |
| 7,362,210 | B2 | 4/2008 | Bazakos et al. |
| 7,362,370 | B2 | 4/2008 | Sakamoto et al. |
| 7,362,884 | B2 | 4/2008 | Willis et al. |
| 7,365,771 | B2 | 4/2008 | Kahn et al. |
| 7,380,938 | B2 | 6/2008 | Chmielewski, Jr. et al. |
| 7,391,865 | B2 | 6/2008 | Orsini et al. |
| 7,404,086 | B2 | 7/2008 | Sands et al. |
| 7,406,184 | B2 | 7/2008 | Wolff et al. |
| 7,414,648 | B2 | 8/2008 | Imada |
| 7,417,682 | B2 | 8/2008 | Kuwakino et al. |
| 7,418,115 | B2 | 8/2008 | Northcott et al. |
| 7,421,097 | B2 | 9/2008 | Hamza et al. |
| 7,436,986 | B2 | 10/2008 | Caldwell |
| 7,443,441 | B2 | 10/2008 | Hiraoka |
| 7,447,911 | B2 | 11/2008 | Chou et al. |
| 7,460,693 | B2 | 12/2008 | Loy et al. |
| 7,466,348 | B2 | 12/2008 | Morikawa et al. |
| 7,467,809 | B2 | 12/2008 | Breed et al. |
| 7,471,451 | B2 | 12/2008 | Dent et al. |
| 7,472,283 | B2 | 12/2008 | Angelo et al. |
| 7,486,306 | B2 | 2/2009 | Azuma et al. |
| 7,486,806 | B2 | 2/2009 | Azuma et al. |
| 7,506,172 | B2 | 3/2009 | Bhakta |
| 7,512,254 | B2 | 3/2009 | Volkommer et al. |
| 7,518,651 | B2 | 4/2009 | Butterworth |
| 7,537,568 | B2 | 5/2009 | Moehring |
| 7,538,326 | B2 | 5/2009 | Johnson et al. |
| 7,542,945 | B2 | 6/2009 | Thompson et al. |
| 7,552,333 | B2 | 6/2009 | Wheeler et al. |
| 7,580,620 | B2 | 8/2009 | Raskar et al. |
| 7,593,550 | B2 | 9/2009 | Hamza |
| 7,639,846 | B2 | 12/2009 | Yoda |
| 7,722,461 | B2 | 5/2010 | Gatto et al. |
| 7,751,598 | B2 | 7/2010 | Matey et al. |
| 7,756,301 | B2 | 7/2010 | Hamza |
| 7,761,453 | B2 | 7/2010 | Hamza |
| 7,777,802 | B2 | 8/2010 | Shinohara et al. |
| 7,804,982 | B2 | 9/2010 | Howard et al. |
| 2001/0026632 | A1 | 10/2001 | Tamai |
| 2001/0027116 | A1 | 10/2001 | Baird |
| 2001/0047479 | A1 | 11/2001 | Bromba et al. |
| 2001/0051924 | A1 | 12/2001 | Uberti |
| 2002/0010857 | A1 | 1/2002 | Karthik |
| 2002/0039433 | A1 | 4/2002 | Shin |
| 2002/0040434 | A1 | 4/2002 | Elliston et al. |
| 2002/0062280 | A1 | 5/2002 | Zachariassen et al. |
| 2002/0112177 | A1 | 8/2002 | Voltmer et al. |
| 2002/0142844 | A1 | 10/2002 | Kerr |
| 2002/0150281 | A1 | 10/2002 | Cho |
| 2002/0154794 | A1 | 10/2002 | Cho |
| 2002/0158750 | A1 | 10/2002 | Almalik |
| 2002/0175182 | A1 | 11/2002 | Matthews |
| 2002/0186131 | A1 | 12/2002 | Fettis |
| 2002/0191075 | A1 | 12/2002 | Doi et al. |
| 2002/0191076 | A1 | 12/2002 | Wada et al. |
| 2002/0194128 | A1 | 12/2002 | Maritzen et al. |
| 2002/0194131 | A1 | 12/2002 | Dick |
| 2002/0198731 | A1 | 12/2002 | Barnes et al. |
| 2003/0002714 | A1 | 1/2003 | Wakiyama |
| 2003/0012413 | A1 | 1/2003 | Kusakari et al. |
| 2003/0038173 | A1 | 2/2003 | Blackson et al. |
| 2003/0046228 | A1 | 3/2003 | Berney |
| 2003/0055689 | A1 | 3/2003 | Block et al. |
| 2003/0055787 | A1 | 3/2003 | Fujii |
| 2003/0065626 | A1 | 4/2003 | Allen |
| 2003/0071743 | A1 | 4/2003 | Seah et al. |
| 2003/0072475 | A1 | 4/2003 | Tamori |
| 2003/0073499 | A1 | 4/2003 | Reece |
| 2003/0074317 | A1 | 4/2003 | Hofi |
| 2003/0074326 | A1 | 4/2003 | Byers |
| 2003/0080194 | A1 | 5/2003 | O'Hara et al. |
| 2003/0092489 | A1 | 5/2003 | Veradej |
| 2003/0098776 | A1 | 5/2003 | Friedli |
| 2003/0099379 | A1 | 5/2003 | Monk et al. |
| 2003/0107097 | A1 | 6/2003 | McArthur et al. |
| 2003/0107645 | A1 | 6/2003 | Yoon |
| 2003/0115148 | A1 | 6/2003 | Takhar |
| 2003/0116630 | A1 | 6/2003 | Carey et al. |
| 2003/0118212 | A1 | 6/2003 | Min et al. |
| 2003/0125054 | A1 | 7/2003 | Garcia |
| 2003/0125057 | A1 | 7/2003 | Pesola |
| 2003/0126560 | A1 | 7/2003 | Kurapati et al. |
| 2003/0131245 | A1 | 7/2003 | Linderman |
| 2003/0133597 | A1 | 7/2003 | Moore et al. |
| 2003/0140235 | A1 | 7/2003 | Immega et al. |
| 2003/0140928 | A1 | 7/2003 | Bui et al. |
| 2003/0141411 | A1 | 7/2003 | Pandya et al. |
| 2003/0149881 | A1 | 8/2003 | Patel et al. |
| 2003/0152251 | A1 | 8/2003 | Ike |
| 2003/0156741 | A1 | 8/2003 | Lee et al. |
| 2003/0158762 | A1 | 8/2003 | Wu |
| 2003/0158821 | A1 | 8/2003 | Maia |
| 2003/0159051 | A1 | 8/2003 | Hollnagel |
| 2003/0163739 | A1 | 8/2003 | Armington et al. |
| 2003/0169334 | A1 | 9/2003 | Braithwaite et al. |
| 2003/0174049 | A1 | 9/2003 | Beigel et al. |
| 2003/0177051 | A1 | 9/2003 | Driscoll et al. |
| 2003/0182151 | A1 | 9/2003 | Taslitz |
| 2003/0182182 | A1 | 9/2003 | Kocher |
| 2003/0189480 | A1 | 10/2003 | Hamid |
| 2003/0189481 | A1 | 10/2003 | Hamid |
| 2003/0191949 | A1 | 10/2003 | Odagawa |
| 2003/0194112 | A1 | 10/2003 | Lee |
| 2003/0210139 | A1 | 11/2003 | Brooks et al. |
| 2003/0225711 | A1 | 12/2003 | Paping |
| 2003/0236120 | A1 | 12/2003 | Reece et al. |
| 2004/0002894 | A1 | 1/2004 | Kocher |
| 2004/0005078 | A1 | 1/2004 | Tillotson |
| 2004/0006553 | A1 | 1/2004 | de Vries et al. |
| 2004/0010462 | A1 | 1/2004 | Moon et al. |

| | | | | | |
|---|---|---|---|---|---|
| 2004/0025030 A1 | 2/2004 | Corbett-Clark et al. | 2010/0033677 A1 | 2/2010 | Jelinek |
| 2004/0025053 A1 | 2/2004 | Hayward | 2010/0034529 A1 | 2/2010 | Jelinek |
| 2004/0030930 A1 | 2/2004 | Nomura | 2010/0239119 A1 | 9/2010 | Bazakos et al. |
| 2004/0037450 A1 | 2/2004 | Bradski | | | |
| 2004/0039914 A1 | 2/2004 | Barr et al. | | | |

FOREIGN PATENT DOCUMENTS

| | | |
|---|---|---|
| EP | 0878780 | 11/1998 |
| EP | 0899680 | 3/1999 |
| EP | 0910986 | 4/1999 |
| EP | 0962894 | 12/1999 |
| EP | 1018297 | 7/2000 |
| EP | 1024463 | 8/2000 |
| EP | 1028398 | 8/2000 |
| EP | 1041506 | 10/2000 |
| EP | 1041523 | 10/2000 |
| EP | 1126403 | 8/2001 |
| EP | 1139270 | 10/2001 |
| EP | 1237117 | 9/2002 |
| EP | 1477925 | 11/2004 |
| EP | 1635307 | 3/2006 |
| GB | 2369205 | 5/2002 |
| GB | 2371396 | 7/2002 |
| GB | 2375913 | 11/2002 |
| GB | 2402840 | 12/2004 |
| GB | 2411980 | 9/2005 |
| JP | 9161135 | 6/1997 |
| JP | 9198545 | 7/1997 |
| JP | 9201348 | 8/1997 |
| JP | 9147233 | 9/1997 |
| JP | 9234264 | 9/1997 |
| JP | 9305765 | 11/1997 |
| JP | 9319927 | 12/1997 |
| JP | 10021392 | 1/1998 |
| JP | 10040386 | 2/1998 |
| JP | 10049728 | 2/1998 |
| JP | 10137219 | 5/1998 |
| JP | 10137221 | 5/1998 |
| JP | 10137222 | 5/1998 |
| JP | 10137223 | 5/1998 |
| JP | 10248827 | 9/1998 |
| JP | 10269183 | 10/1998 |
| JP | 11047117 | 2/1999 |
| JP | 11089820 | 4/1999 |
| JP | 11200684 | 7/1999 |
| JP | 11203478 | 7/1999 |
| JP | 11213047 | 8/1999 |
| JP | 11339037 | 12/1999 |
| JP | 2000005149 | 1/2000 |
| JP | 2000005150 | 1/2000 |
| JP | 2000011163 | 1/2000 |
| JP | 2000023946 | 1/2000 |
| JP | 2000083930 | 3/2000 |
| JP | 2000102510 | 4/2000 |
| JP | 2000102524 | 4/2000 |
| JP | 2000105830 | 4/2000 |
| JP | 2000107156 | 4/2000 |
| JP | 2000139878 | 5/2000 |
| JP | 2000155863 | 6/2000 |
| JP | 2000182050 | 6/2000 |
| JP | 2000185031 | 7/2000 |
| JP | 2000194972 | 7/2000 |
| JP | 2000237167 | 9/2000 |
| JP | 2000242788 | 9/2000 |
| JP | 2000259817 | 9/2000 |
| JP | 2000356059 | 12/2000 |
| JP | 2000357232 | 12/2000 |
| JP | 2001005948 | 1/2001 |
| JP | 2001067399 | 3/2001 |
| JP | 2001101429 | 4/2001 |
| JP | 2001167275 | 6/2001 |
| JP | 2001222661 | 8/2001 |
| JP | 2001292981 | 10/2001 |
| JP | 2001297177 | 10/2001 |
| JP | 2001358987 | 12/2001 |
| JP | 2002119477 | 4/2002 |
| JP | 2002133415 | 5/2002 |
| JP | 2002153444 | 5/2002 |
| JP | 2002153445 | 5/2002 |
| JP | 2002260071 | 9/2002 |
| JP | 2002271689 | 9/2002 |

| | | |
|---|---|---|
| 2004/0042641 A1 | 3/2004 | Jakubowski |
| 2004/0044627 A1 | 3/2004 | Russell et al. |
| 2004/0046640 A1 | 3/2004 | Jourdain et al. |
| 2004/0050924 A1 | 3/2004 | Mletzko et al. |
| 2004/0050930 A1 | 3/2004 | Rowe |
| 2004/0052405 A1 | 3/2004 | Walfridsson |
| 2004/0052418 A1 | 3/2004 | DeLean |
| 2004/0059590 A1 | 3/2004 | Mercredi et al. |
| 2004/0059953 A1 | 3/2004 | Purnell |
| 2004/0117636 A1 | 6/2004 | Cheng |
| 2004/0133804 A1 | 7/2004 | Smith et al. |
| 2004/0160518 A1 | 8/2004 | Park |
| 2004/0162870 A1 | 8/2004 | Matsuzaki et al. |
| 2004/0162984 A1 | 8/2004 | Freeman et al. |
| 2004/0172541 A1 | 9/2004 | Ando et al. |
| 2004/0193893 A1 | 9/2004 | Braithwaite et al. |
| 2004/0233038 A1 | 11/2004 | Beenau et al. |
| 2004/0252866 A1 | 12/2004 | Tisse et al. |
| 2004/0255168 A1 | 12/2004 | Murashita et al. |
| 2005/0008201 A1 | 1/2005 | Lee et al. |
| 2005/0012817 A1 | 1/2005 | Hampapur et al. |
| 2005/0029353 A1 | 2/2005 | Isemura et al. |
| 2005/0052566 A1 | 3/2005 | Kato |
| 2005/0055582 A1 | 3/2005 | Bazakos et al. |
| 2005/0063567 A1 | 3/2005 | Saitoh et al. |
| 2005/0084137 A1 | 4/2005 | Kim et al. |
| 2005/0084179 A1 | 4/2005 | Hanna et al. |
| 2005/0102502 A1 | 5/2005 | Sagen |
| 2005/0125258 A1 | 6/2005 | Yellin et al. |
| 2005/0129286 A1 | 6/2005 | Hekimian |
| 2005/0138385 A1 | 6/2005 | Friedli et al. |
| 2005/0138387 A1 | 6/2005 | Lam et al. |
| 2005/0146640 A1 | 7/2005 | Shibata |
| 2005/0151620 A1 | 7/2005 | Neumann |
| 2005/0152583 A1 | 7/2005 | Kondo et al. |
| 2005/0193212 A1 | 9/2005 | Yuhara |
| 2005/0199708 A1 | 9/2005 | Friedman |
| 2005/0206501 A1 | 9/2005 | Farhat |
| 2005/0206502 A1 | 9/2005 | Bernitz |
| 2005/0210267 A1 | 9/2005 | Sugano et al. |
| 2005/0210270 A1 | 9/2005 | Rohatgi et al. |
| 2005/0238214 A1 | 10/2005 | Matsuda et al. |
| 2005/0240778 A1 | 10/2005 | Saito |
| 2005/0248725 A1 | 11/2005 | Ikoma et al. |
| 2005/0249385 A1 | 11/2005 | Kondo et al. |
| 2005/0255840 A1 | 11/2005 | Markham |
| 2006/0093190 A1 | 5/2006 | Cheng et al. |
| 2006/0147094 A1 | 7/2006 | Yoo |
| 2006/0165266 A1 | 7/2006 | Hamza |
| 2006/0274919 A1 | 12/2006 | LoIacono et al. |
| 2007/0036397 A1 | 2/2007 | Hamza |
| 2007/0140531 A1 | 6/2007 | Hamza |
| 2007/0160266 A1 | 7/2007 | Jones et al. |
| 2007/0189582 A1 | 8/2007 | Hamza et al. |
| 2007/0206840 A1 | 9/2007 | Jacobson |
| 2007/0211924 A1 | 9/2007 | Hamza |
| 2007/0258706 A1* | 11/2007 | Raskar et al. ............... 396/52 |
| 2007/0258707 A1 | 11/2007 | Raskar |
| 2007/0274570 A1 | 11/2007 | Hamza |
| 2007/0274571 A1 | 11/2007 | Hamza |
| 2007/0286590 A1 | 12/2007 | Terashima |
| 2008/0005578 A1 | 1/2008 | Shafir |
| 2008/0075334 A1 | 3/2008 | Determan et al. |
| 2008/0075441 A1 | 3/2008 | Jelinek et al. |
| 2008/0075445 A1 | 3/2008 | Whillock et al. |
| 2008/0104415 A1 | 5/2008 | Palti-Wasserman et al. |
| 2008/0148030 A1 | 6/2008 | Goffin |
| 2008/0211347 A1 | 9/2008 | Wright et al. |
| 2008/0252412 A1 | 10/2008 | Larsson et al. |
| 2008/0259175 A1* | 10/2008 | Muramatsu et al. ....... 348/222.1 |
| 2009/0046899 A1 | 2/2009 | Northcott et al. |
| 2009/0092283 A1 | 4/2009 | Whillock et al. |
| 2009/0316993 A1 | 12/2009 | Brasnett et al. |

| | | |
|---|---|---|
| JP | 2002286650 | 10/2002 |
| JP | 2002312772 | 10/2002 |
| JP | 2002329204 | 11/2002 |
| JP | 2003006628 | 1/2003 |
| JP | 2003036434 | 2/2003 |
| JP | 2003108720 | 4/2003 |
| JP | 2003108983 | 4/2003 |
| JP | 2003132355 | 5/2003 |
| JP | 2003150942 | 5/2003 |
| JP | 2003153880 | 5/2003 |
| JP | 2003242125 | 8/2003 |
| JP | 2003271565 | 9/2003 |
| JP | 2003271940 | 9/2003 |
| JP | 2003308522 | 10/2003 |
| JP | 2003308523 | 10/2003 |
| JP | 2003317102 | 11/2003 |
| JP | 2003331265 | 11/2003 |
| JP | 2004005167 | 1/2004 |
| JP | 2004021406 | 1/2004 |
| JP | 2004030334 | 1/2004 |
| JP | 2004038305 | 2/2004 |
| JP | 2004094575 | 3/2004 |
| JP | 2004152046 | 5/2004 |
| JP | 2004163356 | 6/2004 |
| JP | 2004164483 | 6/2004 |
| JP | 2004171350 | 6/2004 |
| JP | 2004171602 | 6/2004 |
| JP | 2004206444 | 7/2004 |
| JP | 2004220376 | 8/2004 |
| JP | 2004261515 | 9/2004 |
| JP | 2004280221 | 10/2004 |
| JP | 2004280547 | 10/2004 |
| JP | 2004287621 | 10/2004 |
| JP | 2004315127 | 11/2004 |
| JP | 2004318248 | 11/2004 |
| JP | 2005004524 | 1/2005 |
| JP | 2005011207 | 1/2005 |
| JP | 2005025577 | 1/2005 |
| JP | 2005038257 | 2/2005 |
| JP | 2005062990 | 3/2005 |
| JP | 2005115961 | 4/2005 |
| JP | 2005148883 | 6/2005 |
| JP | 2005242677 | 9/2005 |
| WO | WO 97/17674 | 5/1997 |
| WO | WO 97/21188 | 6/1997 |
| WO | WO 98/02083 | 1/1998 |
| WO | WO 98/08439 | 3/1998 |
| WO | WO 99/32317 | 7/1999 |
| WO | WO 99/52422 | 10/1999 |
| WO | WO 99/65175 | 12/1999 |
| WO | WO 00/28484 | 5/2000 |
| WO | WO 00/29986 | 5/2000 |
| WO | WO 00/31677 | 6/2000 |
| WO | WO 00/36605 | 6/2000 |
| WO | WO 00/62239 | 10/2000 |
| WO | WO 01/01329 | 1/2001 |
| WO | WO 01/03100 | 1/2001 |
| WO | WO 01/28476 | 4/2001 |
| WO | WO 01/35348 | 5/2001 |
| WO | WO 01/35349 | 5/2001 |
| WO | WO 01/40982 | 6/2001 |
| WO | WO 01/63994 | 8/2001 |
| WO | WO 01/69490 | 9/2001 |
| WO | WO 01/86599 | 11/2001 |
| WO | WO 02/01451 | 1/2002 |
| WO | WO 02/19030 | 3/2002 |
| WO | WO 02/35452 | 5/2002 |
| WO | WO 02/35480 | 5/2002 |
| WO | WO 02/091735 | 11/2002 |
| WO | WO 02/095657 | 11/2002 |
| WO | WO 03/002387 | 1/2003 |
| WO | WO 03/003910 | 1/2003 |
| WO | WO 03/054777 | 7/2003 |
| WO | WO 03/077077 | 9/2003 |
| WO | WO 2004/029863 | 4/2004 |
| WO | WO 2004/042646 | 5/2004 |
| WO | WO 2004/055737 | 7/2004 |
| WO | WO 2004/089214 | 10/2004 |
| WO | WO 2004/097743 | 11/2004 |
| WO | WO 2005/008567 | 1/2005 |
| WO | WO 2005/013181 | 2/2005 |
| WO | WO 2005/024698 | 3/2005 |
| WO | WO 2005/024708 | 3/2005 |
| WO | WO 2005/024709 | 3/2005 |
| WO | WO 2005/029388 | 3/2005 |
| WO | WO 2005/062235 | 7/2005 |
| WO | WO 2005/069252 | 7/2005 |
| WO | WO 2005/093510 | 10/2005 |
| WO | WO 2005/093681 | 10/2005 |
| WO | WO 2005/096962 | 10/2005 |
| WO | WO 2005/098531 | 10/2005 |
| WO | WO 2005/104704 | 11/2005 |
| WO | WO 2005/109344 | 11/2005 |
| WO | WO 2006/012645 | 2/2006 |
| WO | WO 2006/023046 | 3/2006 |
| WO | WO 2006/051462 | 5/2006 |
| WO | WO 2006/063076 | 6/2006 |
| WO | WO 2006/081209 | 8/2006 |
| WO | WO 2006/081505 | 8/2006 |
| WO | WO 2007/101269 | 9/2007 |
| WO | WO 2007/101275 | 9/2007 |
| WO | WO 2007/101276 | 9/2007 |
| WO | WO 2007/103698 | 9/2007 |
| WO | WO 2007/103701 | 9/2007 |
| WO | WO 2007/103833 | 9/2007 |
| WO | WO 2007/103834 | 9/2007 |
| WO | WO 2008/016724 | 2/2008 |
| WO | WO 2008/019168 | 2/2008 |
| WO | WO 2008/019169 | 2/2008 |
| WO | WO 2008/021584 | 2/2008 |
| WO | WO 2008/031089 | 3/2008 |
| WO | WO 2008/040026 | 4/2008 |

OTHER PUBLICATIONS

Boles, "A Security System Based on Human Iris Identification Using Wavelet Transform," IEEE First International Conference on Knowledge-Based Intelligent Electronic Systems, May 21-23, Adelaide, Australia, pp. 533-541, 1997.

Bonney et al., "Iris Pattern Extraction Using Bit Planes and Standard Deviations," IEEE, pp. 582-586, 2004.

Camus et al., "Reliable and Fast Eye Finding in Close-up Images," IEEE, pp. 389-394, 2002.

Carson et al., "Blobworld: Image Segmentation Using Expectation-Maximization and Its Application to Image Querying," IEEE Transactions on Pattern Analysis and Machine Intelligence, vol. 24, No. 8, pp. 1026-1038, Aug. 2002.

Cui et al., "A Fast and Robust Iris Localization Method Based on Texture Segmentation," 8 pages, 2004.

Cui et al., "An Appearance-Based Method for Iris Detection," 6 pages, 2004.

Cui et al., "An Iris Detection Method Based on Structure Information," Advances in Biometric Person Authentication, International Workshop on Biometric Recognition Systems, IWBRS 2005, Beijing China, 10 pages, Oct. 22-23, 2005.

Cui et al., "An Iris Image Synthesis Method Based on PCA and Super-Resolution," IEEE Computer Society, Proceedings of the 17th International Conference on Pattern Recognition, 6 pages, Aug. 23-26, 2004.

Cui et al., "An Iris Recognition Algorithm Using Local Extreme Points," Biometric Authentication, First International Conference, ICBA 2004, Hong Kong, China, 10 pages, Jul. 15-17, 2004.

Daugman, "Results From 200 Billion Iris Cross-Comparisons," University of Cambridge Computer Laboratory, Technical Report, No. 635, 8 pages, Jun. 2005.

Daugman, "How Iris Recognition Works," IEEE 2002 International Conference on Image Processing, vol. I of III, 6 pages, Sep. 22-25, 2002.

Du et al., "A One-Dimensional Approach for Iris Identification," 11 pages, prior to Jan. 25, 2006.

Guo et al., "A System for Automatic Iris Capturing," Mitsubishi Electric Research Laboratories, Inc., 10 pages, 2005.

Guo, "Face, Expression, and Iris Recognition Using Learning-Based Approaches," 132 pages, 2006.

http://www.newscientisttech.com/article/dn11110-invention-covert-iris-sc, "Invention: Covert Iris Scanner," 3 pages, printed Feb. 8, 2007.

Huang et al., "Iris Model Based On Local Orientation Description," 5 pages, prior to Jan. 25, 2006.

Huang et al., "An Efficient Iris Recognition System," IEEE Proceedings of the First International Conference on Machine Learning and Cybernetics, Beijing, pp. 450-454, Nov. 4-5, 2002.

Jalaja et al., "Texture Element Feature Characterizations for CBIR," IEEE, pp. 733-736, 2005.

Kalka et al., "Image Quality Assessment for Iris Biometric," Proc. Of SPIE vol. 6202 62020D, 11 pages, 2006.

Ko et al., "Monitoring and Reporting of Fingerprint Image Quality and Match Accuracy for a Large User Application," IEEE Computer Society, Proceedings of the 33$^{rd}$ Applied Imagery Pattern Recognition Workshop, 6 pages, 2004.

Lau et al., "Finding a Small Number of Regions in an Image Using Low-Level Features," Pattern Recognition 35, pp. 2323-2339, 2002.

Ma et al., "Personal Identification Based On Iris Texture Analysis," IEEE Transactions on Pattern Analysis and Machine Intelligence, vol. 25, No. 12, pp. 1519-1533, Dec. 2003.

Masek, "Recognition of Human Iris Patterns for Biometric Identification," 61 pages, 2003.

Maurer et al., "Tracking and Learning Graphs and Pose on Image Sequences of Faces," IEEE Computer Society Press, International Conference on Automatic Face and Gesture Recognition, pp. 176-181, Oct. 14-16, 1996.

Oppenheim et al, "The Importance of Phase in Signals," Proceedings of the IEEE, vol. 69, No. 5, pp. 529-541, 1981.

Ratha et al., "A Real-Time Matching System for Large Fingerprint Databases," IEEE Transactions on Pattern Analysis, and Machine Intelligence, vol. 18, No. 8, pp. 799-812, Aug. 1996.

Sony, "Network Color Camera, SNC-RZ30N (NTSC)," 6 pages, Aug. 2002.

Sun et al., "Robust Encoding of Local Ordinal Measures: A General Framework of Iris Recognition," 13 pages, prior to Jan. 25, 2006.

Wang et al, "Image Quality Assessment: From Error Visibility to Structural Similarity," IEEE Transactions on Image Processing, vol. 13, No. 4, pp. 600-612, Apr. 2004.

Wang et al., "A Universal Image Quality Index," IEEE Signal Processing Letters, vol. 9, No. 3, pp. 81-84, Mar. 2002.

Wang et al., "Local Phase Coherence and the Perception of Blur," Advances in Nueral Information Processing Systems 16, pp. 1435-1442, 2004.

AOptix Technologies, "Introducing the AOptix InSight 2 Meter Iris Recognition System," 6 pages, 2010.

Belhumeur et al., "Eigenfaces Vs. Fisherfaces: Recognition Using Class Specific Linear Projection," 14 pages, prior to Jun. 11, 2010.

Bentley et al., "Multidimensional Binary Search Trees Used for Associative Searching," Communications of the ACM, vol. 18, No. 9, pp. 509-517, Sep. 1975.

Blackman et al., "Chapter 9, Multiple Sensor Tracking: Issues and Methods," Design and Analysis of Modern Tracking Systems, Artech House, pp. 595-659, 1999.

Brasnett et al., "A Robust Visual Identifier Using the Trace Transform," 6 pages, prior to Jun. 11, 2010.

Buades et al., "A Review of Image Denoising Algorithms, with a New One," Multiscale Modeling & Simulation, vol. 4, No. 2, pp. 490-530, 2005.

Chen et al., "Localized Iris Image Quality Using 2-D Wavelets," LNCS vol. 3832, pp. 373-381, 2005.

Chow et al., "Towards a System for Automatic Facial Feature Detection," Pattern Recognition vol. 26, No. 12, pp. 1739-1755, 1993.

U.S. Appl. No. 12/792,498, filed Jun. 2, 2010.

U.S. Appl. No. 12/814,232, filed Jun. 11, 2010.

U.S. Appl. No. 12/814,272, filed Jun. 11, 2010.

Cula et al., "Bidirectional Imaging and Modeling of Skin Texture," Proceedings of Texture 2003, 6 pages, Oct. 17, 2003.

Cula et al., "Bidirectional Imaging and Modeling of Skin Texture," IEEE Transactions on Biomedical Engineering, vol. 51, No. 12, pp. 2148-2159, 2004.

Cula et al., "Compact Representation of Bidirectional Texture Functions," Proceedings of IEEE Computer Society Conference on Computer Vision and Pattern Recognition 2001, 8 pages, 2001.

Cula et al., "Skin Texture Modeling," International Journal of Computer Vision 2004, 34 pages, 2004.

Dabov et al., "Image Denoising by Sparse 3-D Transform-Domain Collaborative Filtering," IEEE Transactions on Image Processing, vol. 16, No. 8, pp. 2080-2095, Aug. 2007.

Dabov et al., "Image Restoration by Spars 3D Transform Collaborative Filtering," SPIE vol. 6812 681207-1, 12 pages, 2008.

Daugman, "High Confidence Visual Recognition of Persons by a Test of Statistical Independence," IEEE Transactions on Pattern Analysis and Machine Intelligence, vol. 15, No. 11, pp. 1148-1161, 1993.

Daugman, "Probing the Uniqueness and Randomness of Iris Codes: Results from 200 Billion Iris Pair Comparisons," Proceedings of the IEEE vol. 94, No. 11, pp. 1928-1935, Nov. 2006.

Fooprateepsiri et al., "A Highly Robust Method for Face Authentication," IEEE 2009 First Asian Conference on Intelligent Information and Database Systems, pp. 380-385, 2009.

Fooprateepsiri et al., "Face Verification Base-On Hausdorff-Shape Context," IEEE 2009 Asia Conference on Informatics in Control, Automation and Robotics, pp. 240-244, 2009.

Forstner et al., "A Metric for Covariance Matrices," 16 pages, prior to Jun. 11, 2010.

Gan et al., "Applications of Wavelet Packets Decomposition in Iris Recognition," LNCS vol. 3832, pp. 443-449, 2005.

Hampapur et al., "Smart Surveillance: Applications, Technologies and Implications," IEEE, 6 pages, Dec. 15-18, 2003.

Hamza et al., "Standoff Iris Recognition Usin Non-Iterative Polar Based Segmentation," Proceedings of SPIE vol. 6944, 8 pages, 2008.

Hanna et al., "A System for Non-Intrusive Human Iris Acquisition and Identification," IAPR Workshop on Machine Vision Applications, pp. 200-203, Nov. 12-14, 1996.

http://en.wikipedia.org/wiki/Radon_transform, "Radon Transform," 5 pages, printed May 14, 2010.

Ivins et al., "A Deformable Model of the Human Iris for Measuring Small Three-Dimensional Eye Movements," Machine Vision and Applications, vol. 11, pp. 42-51, 1998.

Kadyrov et al., "The Trace Transform and Its Applications," IEEE Transactions on Pattern Analysis and Machine Intelligence, vol. 23, No. 8, pp. 811-828, Aug. 2001.

Kadyrov et al., "The Trace Transform as a Tool to Invariant Feature Construction," 3 pages, prior to Jun. 11, 2010.

Kang et al., "Improved Dual Action Contour for Iris Recognition," 10 pages, prior to Jun. 11, 2010.

Kawaguchi et al., "Detection of Eyes from Human Faces by Hough Transform and Separability Filter," IEEE, 4 pages, 2000.

Kong et al., "Detecting Eyelash and Reflection for Accurate Iris Segmentation," International Journal of Pattern Recognition and Artificial Intelligence, vol. 17, No. 6, pp. 1025-1034, 2003.

Li et al., "Appearance Modeling Using a Geometric Transform," IEEE Transactions on Image Processing, 17 pages, 2008.

Li et al., "Appearance Modeling Using a Geometric Transform," Journal Preparation for IEEE Transactions on Image Processing, 30 pages, Nov. 5, 2006.

Ma et al., "Local Intensity Variation Analysis for Iris Recognition," Pattern Recognition, vol. 37, pp. 1287-1298, 2004.

Ma et al., "Video Sequence Querying Using Clustering of Objects' Appearance Models," Advances in Visual Computing Third Annual Symposium, ISVC 2007, 14 pages, 2007.

Monro et al., "DCT-Based Iris Recognition," IEEE Transactions on Pattern Analysis and Machine Intelligence, vol. 29, No. 4, Apr. 2007.

Noh et al., "A Novel Method to Extract Features for Iris Recognition System," AVBPA 2003, LNCS 2688, pp. 862-868, 2003.

Ojala et al., "Multiresolution Gray-Scale and Rotation Invariant Texture Classification with Local Binary Patterns," IEEE Transactions on Pattern Analysis and Machine Intelligence, vol. 24, No. 7, 18 pages, Jul. 2002.

Pamudurthy et al., "Dynamic Approach for Face Recognition Using Digital Image Skin Correlation," Audio and Video Based Person Authentication 5$^{th}$ International Conference, AVBPA 2005, Hilton Rye Town, NY, USA, 11 pages, Jul. 20-22, 2005.

Petrou et al., "The Trace Transform in a Nutshell," 9 pages, prior to Jun. 11, 2010.
Phillips et al., "FRVT 2006 and ICE 2006 Large-Scale Results," 56 pages, Mar. 2007.
Porikli et al., "Covariance Tracking Using Model Update Based on Means on Riemannian Manifolds," 8 pages, prior to Jun. 11, 2010.
Proenca et al., "Toward Noncooperative Iris Recognition: A Classification Approach Using Multiple Signatures," IEEE Transactions on Patern Analysis and Machine Intellingence, vol. 29, No. 4, pp. 607-612, Apr. 2007.
Ross et al., "Segmenting Non-Ideal Irises Using Geodesic Active Contours," IEEE 2006 Biometrics Symposium, 3 pages, 2006.
Shapiro et al., pp. 556-559 in Book Entitled "Computer Vision," Prentice Hall, prior to Jun. 11, 2010.
Stillman et al., "A System for Tracking and Recognizing Multiple People with Multiple Cameras," 6 pages, Aug. 1998.
Sun Et al., "Iris Recognition Based on Non-local Comparisons," Sinobiometrics 2004, LNCS 3338, pp. 67-77, 2004.
Suzaki et al., "A Horse Identification System Using Biometrics," Systems and Computer in Japan, vol. 32, No. 14, pp. 12-23, 2001.
Trucco et al., "Robust Iris Location in Close-up Images of the Eye," Pattern Anal. Applic. vol. 8, pp. 247-255, 2005.
Turan et al., "Trace Transform Based Invariant Object Recognition System," 4 pages, prior to Jun. 11, 2010.
Turk et al., "Eigenfaces for Recognition," Journal of Cognitive Neuroscience, vol. 3, No. 1, 16 pages, 1991.
Wang et al., "Recent Developments in Human Motion Analysis," Pattern Recognition, vol. 36, pp. 585-601, 2003.
Wei et al., "Robust and Fast Assessment of Iris Image Quality," LNCS vol. 3832, pp. 464-471, 2005.
Zhao et al., "Dynamic Texture Recognition Using Local Binary Patterns with an Application to Facial Expressions," IEEE Transactions on Pattern Analysis and Machine Intelligence, vol. 29, No. 6, pp. 915-928, Jun. 2007.
Zhi-Hui et al., "Research Iris Serial Images Quality Assessment Method Based on HVS," Proceedings of SPIE, vol. 6034, 6 pages, 2006.
U.S. Appl. No. 13/077,821, filed Mar. 30, 2011.
Freeboy, "Adaptive Optics Speeds Up Airport Immigration," Optics.org/ole, 2 pages, Jan. 2009.
http://www.imagine-eyes.com/content/view/100/115/, "INOVEO—Ultra-High Resolution Retinal Imaging with Adaptive Optics," 2 pages, printed Feb. 22, 2010.

* cited by examiner

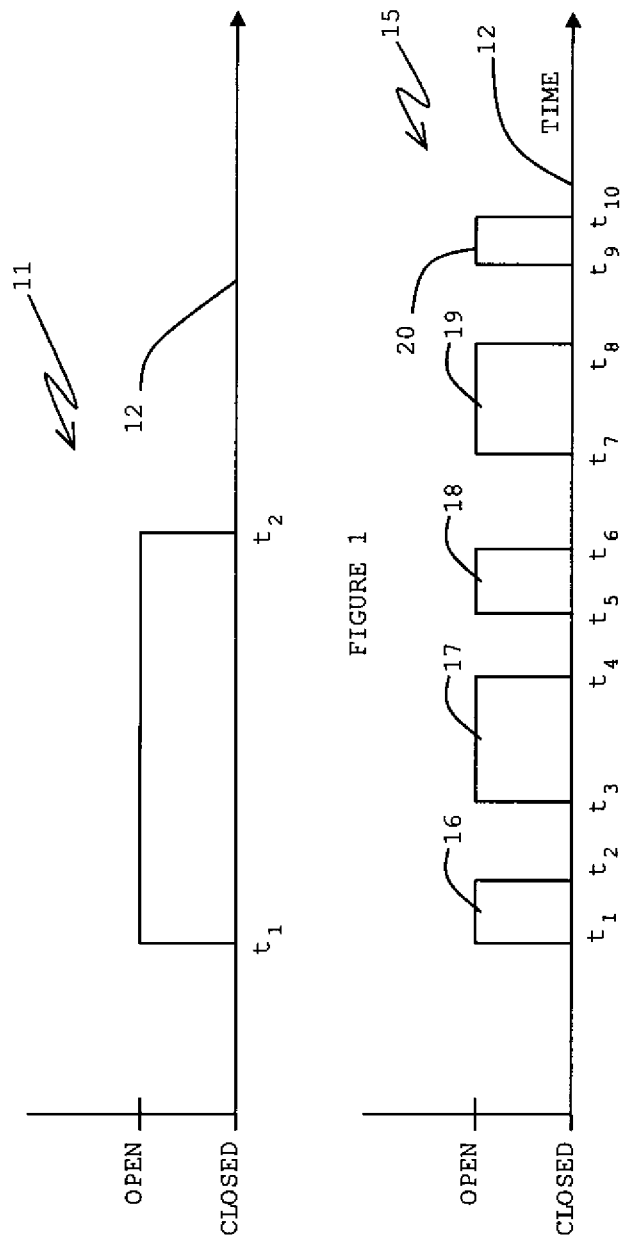

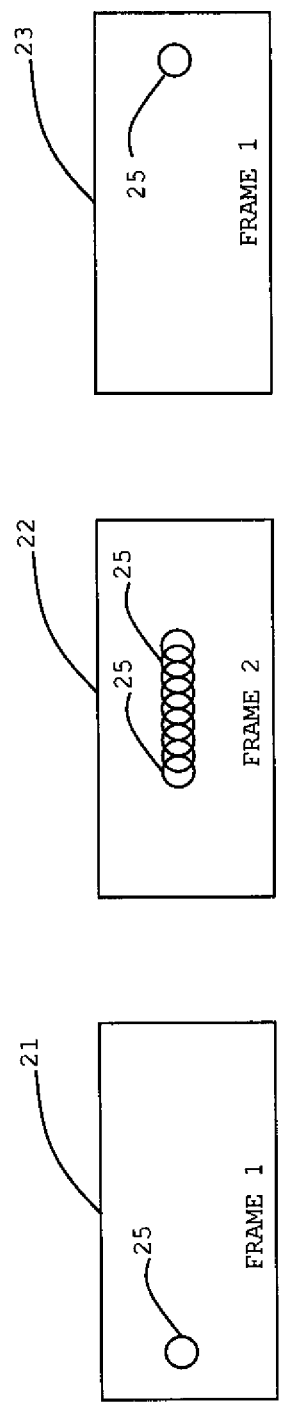

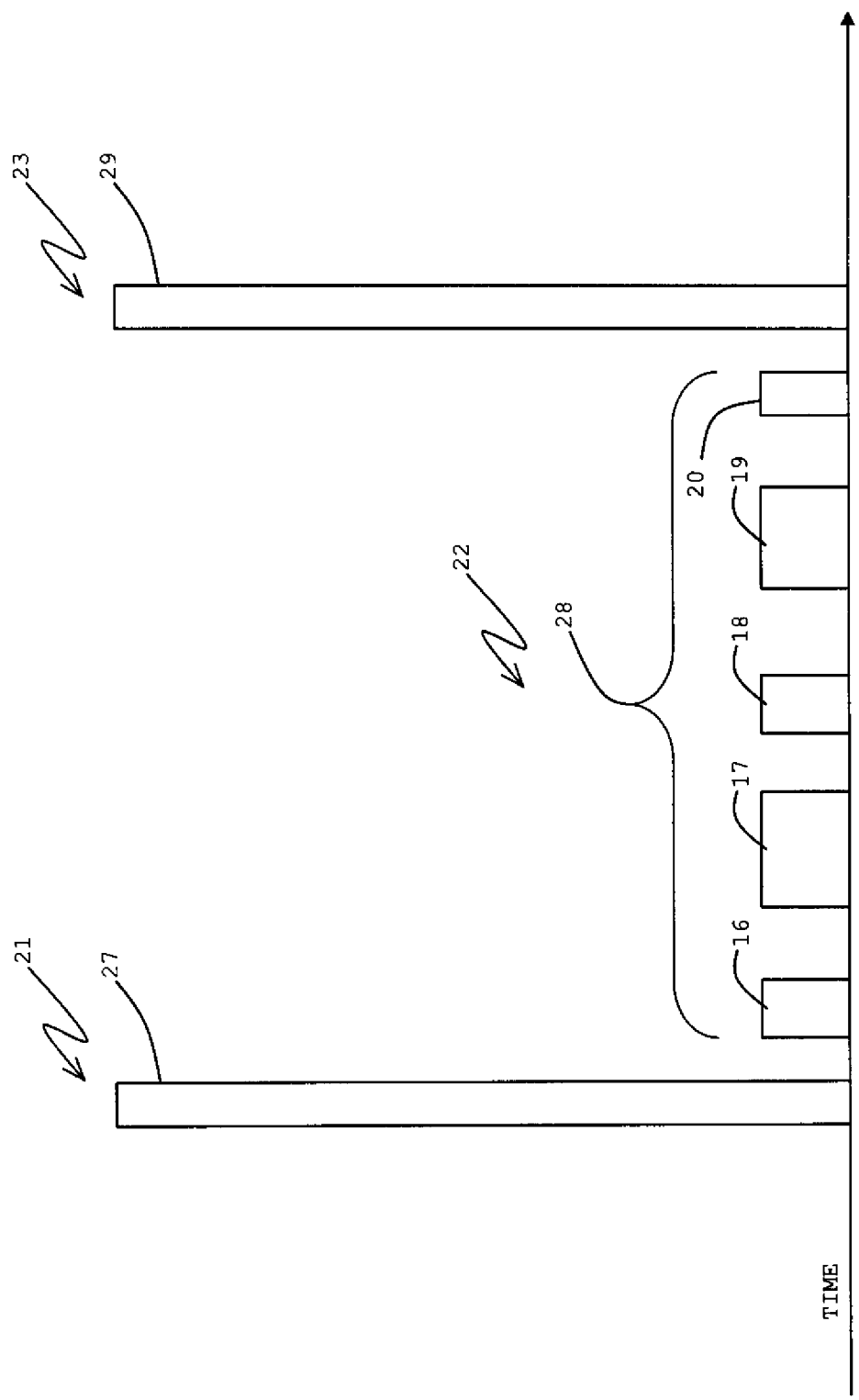

HETEROGENEOUS VIDEO CAPTURING SYSTEM

This present patent application is a continuation-in-part of U.S. patent application Ser. No. 12/501,874, filed Jul. 13, 2009, entitled "Acquisition System for Obtaining Sharp Barcode Images Despite Motion"; which in turn is a continuation-in-part of U.S. patent application Ser. No. 12/126,761, filed May 23, 2008, entitled "Simulating a Fluttering Shutter from Video Data"; which claims the benefit of U.S. Provisional Patent Application No. 61/052,147, filed May 9, 2008, entitled "Simulating a Fluttering Shutter from Video Data".

This present patent application is a continuation-in-part of U.S. patent application Ser. No. 12/501,874, filed Jul. 13, 2009, entitled "Acquisition System for Obtaining Sharp Barcode Images Despite Motion"; which in turn is a continuation-in-part of U.S. patent application Ser. No. 12/421,296, filed Apr. 9, 2009, entitled "Method and System for Determining Shutter Fluttering Sequence"; which claims the benefit of U.S. Provisional Patent Application No. 61/156,739, filed Mar. 2, 2009, entitled "Method and System for Determining Shutter Fluttering Sequence".

U.S. patent application Ser. No. 12/501,874, filed Jul. 13, 2009, is hereby incorporated by reference. U.S. patent application Ser. No. 12/126,761, filed May 23, 2008, is hereby incorporated by reference. U.S. patent application Ser. No. 12/421,296, filed Apr. 9, 2009, is hereby incorporated by reference. U.S. Provisional Patent Application No. 61/052,147, filed May 9, 2008, is hereby incorporated by reference. U.S. Provisional Patent Application No. 61/156,739, filed Mar. 2, 2009, is hereby incorporated by reference.

The U.S. Government may have certain rights in the present invention.

BACKGROUND

This invention pertains to image blur removal mechanisms. Particularly, the invention pertains to cameras and more particularly to non-continuous shutter cameras.

BACKGROUND

The invention pertains to cameras, and particularly cameras for taking pictures of items having a motion relative to the cameras. More particularly, the invention pertains to camera blur compensating mechanisms.

SUMMARY

The invention is a heterogeneous image capturing system having motion and blur estimation. An item of motion may be captured with a continuous shutter and a flutter shutter. The flutter shutter image may be preceded and following by a continuous shutter image. Motion of a subject of the images may be estimated from the continuous shutter images. The estimated motion may be a basis for blur estimation and blur removal in the flutter shutter image.

BRIEF DESCRIPTION OF THE DRAWING

FIG. 1 is a diagram showing a profile of a continuous shutter;

FIG. 2 is a diagram showing a profile of a flutter shutter;

FIG. 3 is a diagram of three frames obtained with a continuous shutter, a flutter shutter and a continuous shutter, respectively;

FIG. 4 is a diagram of shutter amplification and time exposures for the frames, respectively, in FIG. 3.

DESCRIPTION

Figure 5:
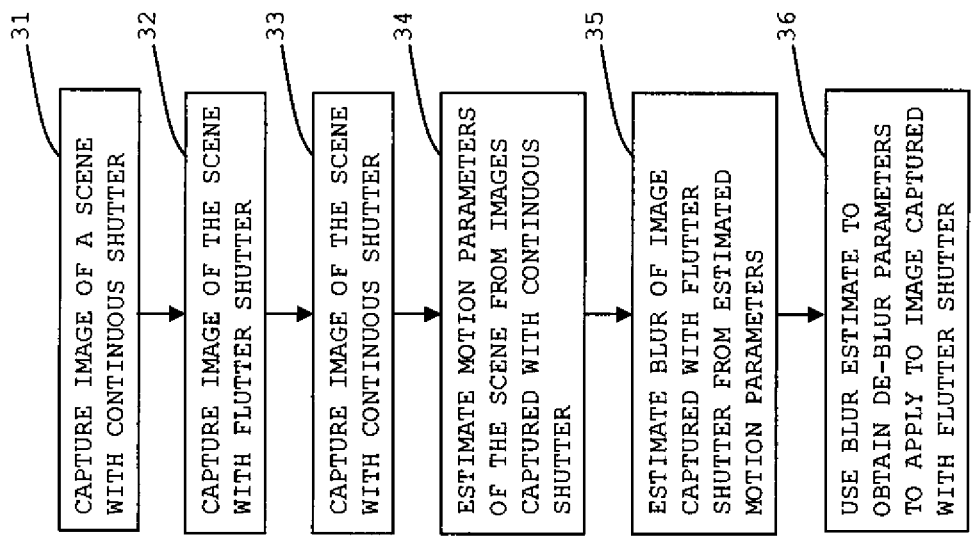
FIG. 5 is a diagram of an approach for capturing and de-blurring a flutter shutter image.

In many imaging applications, particularly relative to post-processing for removing blur, it appears necessary to have an estimate of parameters such as the speed of either a camera or moving objects within an image taken by the camera, or relative speed between the camera and the objects. The motion/blur estimation problem may be under-constrained from a single blurred image, making it necessary to either bring in outside information to further constrain the problem or make assumptions about the scene to add constraints.

Related patent applications may include U.S. patent application Ser. No. 11/430,233, filed May 8, 2006, entitled "Method and Apparatus for Deblurring Images"; and U.S. patent application Ser. No. 11/429,694, filed May 8, 2006, entitled "Method for Deblurring Images Using Optimized Temporal Coding Patterns"; all of which are hereby incorporated by reference.

In particular, one may be concerned with de-blurring of images with motion blur. Such images may arise in many settings. Examples may include the following. A capture of iris images from moving subjects; a capture of iris images from a moving platform having stationary subjects; and a capture of vehicle license plate images from a stationary camera, e.g., stoplight cameras.

For various combinations of lighting and speed, the necessary details of images may be irrecoverably lost. Moreover, when post-processing non-continuous imagery such as a flutter shutter image, many existing approaches are not applicable due to a non-traditional point spread function. In order to use these existing methods, it appears necessary to acquire common imagery.

The present approach may allow for constrained blur estimation by capturing several images of different types, thus providing a basis for de-blurring flutter shutter imagery which would likely result in relatively clear and useful imagery. Traditional blur estimation methods cannot necessarily be applied to remedy the detrimental effects (e.g., blur) of non-continuous shutter imagery. To obtain an effective blur estimation, a continuous shutter may used. The continuous shutter may also be regarded as a single integration shutter. So instead of trying to estimate the blur from the flutter shutter image without any prior knowledge, one may acquire images with the continuous shutter both before and after each flutter shutter image capture. These non-flutter "bookend" images (i.e., from a continuous shutter) may be analyzed with classical analytics, and provide good approximations of certain parameters, with linear and non-linear aspects, such as those of motion which might or might not be refined by additionally analyzing (though not necessarily needed) also the flutter shutter image. The obtained parameters may be used for obtaining a blur estimate of the flutter shutter image. The blur estimate may be used to de-blur the flutter shutter image.

Instead of capturing a single flutter shutter image (or a video sequence of such images), one may capture a heterogeneous sequence of frames, alternating between flutter shutter and continuous shutter images. In addition to changes in the shuttering, it may also be necessary to change the amplification (gain), decrease the effective resolution (bin pixels) or otherwise change the camera settings between modes in order to get well-exposed continuous shutter images without severe motion blur.

Given a pair of bookend (e.g., continuous shutter) images taken immediately before and after the flutter shutter image, then, it is possible to perform localization in each using traditional methods that assume a continuous shutter. For example, one may locate eyes within the bookend images and measure the change in their position (the displacement) between the two positions of the eyes. Given the timestamp corresponding to each of the bookend images, one may compute the effective velocity of the eye in terms of pixels/ms. This may be used to select appropriate fluttering patterns, as well as give a good estimate of the blur direction and extent in the fluttering shutter image.

One may use a single camera with multiple triggering modes to acquire the heterogeneous video. The camera, for example the Point Grey Flea2 camera, would need to support both continuous shutter and fluttering shutter modes. The control software may switch between these modes in a cycle, while performing auto-exposure, optical focusing, velocity estimation, and optional targeting of scene regions.

The acquired stream of images may be passed on to the blur estimation component, which estimates blur and applies de-blurring. The blur estimate may incorporate estimates of various parameters which may be applied in de-blurring an image of the flutter shutter. As an optional side-effect, the blur estimate can be fed back into the camera control software in order to select an appropriate fluttering pattern.

FIG. 1 is a diagram showing a profile 11 of a continuous shutter. The shutter is regarded as open between $t_1$ and $t_2$ on time line 12. Other portions of time line 12 show the shutter to be closed. An image may be read out after time $t_2$.

FIG. 2 is a diagram showing a profile 15 of a flutter shutter. The image shutter time may begin at $t_1$ and end at $t_2$. The shutter may be regarded as "fluttering" between $t_1$ and $t_{10}$. The shutter may open at $t_1$ and close at $t_2$. This open period 16 may be regarded as a chop 1. The shutter may open again at $t_3$ and close at $t_4$. This open period may be regarded as a chop 2. Open and close times $t_5$ and $t_6$, $t_7$ and $t_8$, and $t_9$ and $t_{10}$, respectively, may be regarded as chop 3, chop 4 and chop 5, in that order. Chops 1-5 are labeled as chops 16-20, respectively. An image may be read out after time $t_{10}$.

A blur estimation may take into consideration of how far, how fast and in what direction an object, which is a subject of the flutter shutter, moves between $t_1$ and $t_{10}$.

FIG. 3 is a diagram of three frames 21, 22 and 23. Frames 21 and 23 may be obtained with continuous shutters. Frame 22 may be obtained with a flutter shutter. There may be a continued series of frames where a flutter shutter has a continuous shutter preceding it and a continuous shutter subsequent to it. For example, a series of frames may be numbered 1, 2, 3 . . . N; the continuous frames may be numbered 1, 3, 5 . . . N; and the flutter frames may be numbered 2, 4, 6 . . . N−1.

One may note an object 25 in frame 21 to the left. During the taking of images which includes object 21, one may see that object 21 travels nearly the distance of the width of a frame, in that object 25 appears to the right of frame 23. The flutter shuttering at frame 22 reveals multiple images of object 25 due to the chops across frame 22 as shown in FIG. 2.

In FIG. 3, one may determine the distance that object 25 has traveled from frame 21 through frame 23. For instance, it may be assumed that the distance traveled is 500 pixels during the time $t_1$ of the first frame to the time $t_3$ for the second frame. The result of $(500 \text{ pixels})/(t_3-t_1)$ may determine the shutter sequence for the next shutter frame after frame 23.

FIG. 4 is a diagram of shutter amplification and time exposures for frames 21-23 of FIG. 3. A shutter profile 27 of frame 21 appears tall and narrow. This means the narrowness of profile 27 represents the short exposure. The tall height of profile 27 represents high amplification of the pertinent frame 21. A shutter profile 28 of frame 22 appears low which represents low amplification. The number of chops may add up to a long exposure. A shutter profile 29 of frame 23 is similar to profile 27 of frame 21. The exposure of a shutter profile may be regarded in proportion to the area within the shutter profile. The total overall amount of light captured by a continuous shutter, e.g., 21 or 23, and the flutter shutter 22 for a certain scenario of images may be regarded as the same.

FIG. 5 is a flow diagram of a sequence of the heterogeneous image or video capturing system. An image of a scene may be captured with a continuous shutter at symbol 31. Another image of the scene may be captured with a flutter shutter at symbol 32. Still another image of the scene may be captured with the continuous shutter at symbol 33. Motion parameters of the scene may be estimated from images captured with the continuous shutter, at symbol 34. In some instances, information from the image captured with the flutter shutter may be obtained for estimating the motion parameters. Blur of the image captured with the flutter shutter may be estimated from the motion parameters, at symbol 35. The blur estimate may be used to derive de-blur parameters to be applied to the image captured with the flutter shutter, at symbol 36. Other parameters may be obtained from the images captured with the continuous shutter, and in some cases also from the image captured with the flutter shutter, for de-blurring the image captured with the flutter shutter. Parameters may be obtained for improving other aspects (e.g., color or lighting) of the image captured with the flutter shutter.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for capturing video, comprising:
   capturing a first image with a continuous shutter;
   capturing a second image with a flutter shutter;
   capturing a third image with the continuous shutter;
   determining the motion of an object relative to the continuous and flutter shutters from the first and third images;
   estimating blur from the motion of the object and the second image;
   developing one or more de-blur parameters from the estimated blur; and
   applying the one or more de-blur parameters to the second image.

2. The method of claim 1, further comprising using the motion of the object to select a fluttering pattern for the flutter shutter.

3. The method of claim 1, further comprising performing auto-exposure while capturing the first, second and third images.

4. The method of claim 1, wherein the object is an iris.

5. A flutter shutter image capturing system comprising:
   a flutter shutter;
   a continuous shutter; and
   a processor controlling the flutter shutter and the continuous shutter; and wherein:
an image captured by the flutter shutter is preceded by an image captured by the continuous shutter and followed by an image captured by the continuous shutter;
parameters of motion of an object in the images relative to the continuous and flutter shutters are approximated from the images preceding and following the image captured by the flutter shutter; and
the parameters of motion are input to the processor for obtaining a blur estimate of the image captured by the flutter shutter.

6. The system of claim 5, wherein the processor derives de-blurring parameters from the blur estimate and applies the de-blurring parameters to the image captured by the flutter shutter.

7. The system of claim 6, wherein:
the flutter shutter has a flutter pattern of a group consisting of various fluttering patterns; and
the processor uses the parameters of motion to select an appropriate fluttering pattern from the group consisting of various fluttering patterns for the flutter shutter; and
wherein:
a fluttering pattern has a number of chops;
each chop has an active duration of time;
each chop is separated from another chop by a inactive duration of time; and
various fluttering patterns may differ from one another in terms of the number of chops, the active durations of time, and/or the inactive durations of time.

8. The system of claim 5, wherein:
the continuous shutter and the flutter shutter alternatively capture a series of images; and
the object in the images is of a group consisting of irises, vehicular license plates, and items moveable relative to the continuous and flutter shutters.

9. The system of claim 5, wherein:
the continuous shutter has a profile of a first time exposure and a first light gain;
the flutter shutter has a profile of a second time exposure and a second light gain;
the second time exposure is greater than the first time exposure; and
the first light gain is greater than the second light gain.

10. The system of claim 9, wherein total amounts of light captured by the continuous shutter and the flutter shutter for an image are the same.

11. A video capture system comprising:
a camera;
a processor connected to the camera; and
wherein the camera comprises:
a continuous shutter; and
a flutter shutter; and
wherein:
a first image of a target is captured with the continuous shutter;
a second image is captured with the flutter shutter;
a third image is captured with the continuous shutter;
the images taken with the continuous shutter before and after each image with the flutter shutter are analyzed to provide an approximation of motion of the target to obtain a blur estimation of the image taken with the flutter shutter; and
the blur estimation is used for de-burring the image taken with the flutter shutter.

12. The system of claim 11, wherein the first, second and third images are captured in that order, respectively.

13. The system of claim 12, wherein a motion of the target is determined from the first to third images.

14. The system of claim 13, wherein:
a fourth image of the target is captured with the continuous shutter;
a fifth image of the target is captured with the flutter shutter; and
a pattern of the flutter shutter is determined according to the motion of the target in the first to third images.

15. The system of claim 14, wherein the pattern of the flutter shutter has a number of chops;
each chop has an active duration of time;
each chop is separated from another chop by an inactive duration of time; and
various patterns of the flutter shutter may differ from one another in terms of the number of chops, the active durations of time, and/or the inactive durations of time.

16. The system of claim 14, wherein the fifth image is de-blurred with information from the motion of the target.

17. The system of claim 12, wherein:
the continuous shutter has a profile of a first time exposure and a first light amplification;
the flutter shutter has a profile of a second time exposure and a second light amplification;
the second time exposure is greater than the first time exposure; and
the first light amplification is greater than the second light amplification.

18. The system of claim 17, wherein the total amounts of light captured by the continuous shutter and the flutter shutter for an image are the same.

19. The system of claim 11, wherein the blur estimation is provided to the processor to obtain an appropriate fluttering pattern for the flutter shutter.

* * * * *